Sept. 4, 1945.  L. H. STOYE  2,384,207
SAND TRAP
Filed Feb. 23, 1944

INVENTOR.
LOTHAR H. STOYE.
BY
Harry C. Schweder
ATTORNEY

Patented Sept. 4, 1945

2,384,207

UNITED STATES PATENT OFFICE 2,384,207

SAND TRAP

Lothar H. Stoye, San Leandro, Calif.

Application February 23, 1944, Serial No. 523,769

3 Claims. (Cl. 61—3)

This invention relates to a sand reclaiming or retaining structure for shore lines on ocean or lake fronts, where the ceaseless action of the waves tends to wash out the sand and thus undermine the foundations of structures erected on the beach.

The major object of the invention is to provide a trap or crib of such a nature that when waves wash over or against the same, a certain amount of the sand suspended in the waves will be retained in the trap without preventing back-flow of the water. In this manner, a bank or deposit of sand will be built up, protecting any structures which may be disposed behind the trap.

Another object is to provide a trap for the purpose which may be quickly and easily erected, and which may under certain conditions be mainly manufactured on the job, with the use of some of the beach sand itself.

Also, the trap is inexpensive and relatively indestructible.

Figure 1:
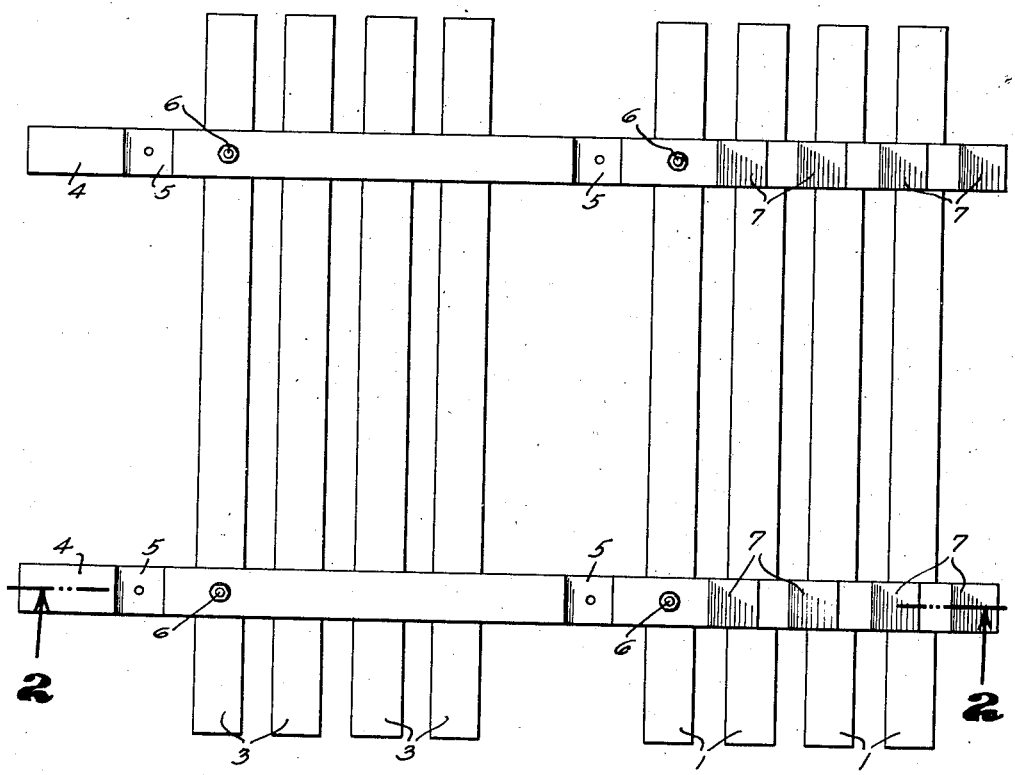
Figure 1 is a top plan view of the sand trap or cribbing.
Figure 2:
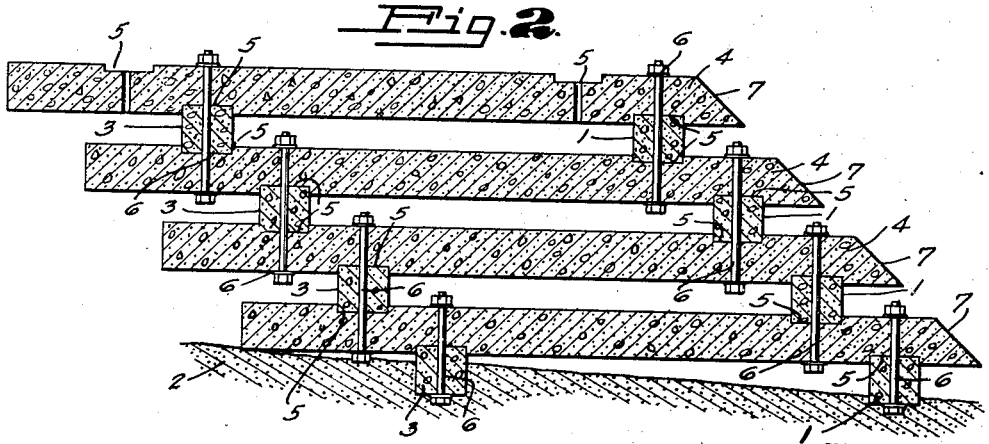
Figure 2 is a transverse sectional elevation on line 2—2 of Figure 1.

Referring to the characters of reference on the drawing, the trap comprises a series of rectangular beams 1, extending horizontally and lengthwise of the beach 2 back a certain distance from the normal waterline, and disposed in vertically spaced set-back relation from the lowest beam upwardly.

A similar set or series of beams 3, parallel to and on the same levels as beams 1, are disposed a certain distance back from beams 1. Each beam of the second set or series of beams 3 is to the rear of, opposite to and in the same horizontal plane as a beam 1 of the first set or series, the beams 3 being separated from the beams 1 by the same predetermined distance.

Beams 1 and 3 are maintained in spaced relation and rigidly tied together by other cross beams 4 which extend transversely of beams 1 and 3 a short distance from their front ends; beams 4 being matched on their upper and lower faces as at 5 to locate and maintain beams 1 and 3 against relative separation. Bolts 6 through the different beams at their points of crossing tie them together. The front ends of beams 4 (which face the water) are preferably sloped upwardly and rearwardly sloped from their lower edges as at 7.

The beams are made of concrete, pre-cast, and may be easily erected where needed with the aid of a simple power hoist, and as many separate units may of course be arranged in end to end relation as the conditions may require.

The natural weight of the structure, plus the anchoring effect of the sand accumulating therein, makes it unlikely that the trap will be dislodged or washed away by a storm. Also, the main elements of the trap being of concrete, the trap will not be affected by the teredos or other marine insects, nor can it rot.

The lowest beams 1 and 3 are countersunk in the beach, and as each wave flows against or breaks over the trap a certain amount of sand is deposited between and retained by said lowest beams, until an artificial level has been built up to the next pair of beams, which will then gradually retain additional sand and so on.

I claim:

1. A shore front sand trap comprising a set of horizontally disposed parallel beams arranged in vertically spaced set back relation, a second set of similar horizontally disposed parallel beams also arranged in vertically spaced set-back relation, each beam of the second set being to the rear of, opposite to and in the same horizontal plane as a beam of the first set, the beams of said second set being separated from those of the first set by the same predetermined distance, and a plurality of cross beams secured to the beams of both of the first mentioned sets in alternating relation with respect thereto.

2. A shore front sand trap comprising a set of horizontally disposed parallel beams arranged in vertically spaced set-back relation, a second set of similar horizontally disposed parallel beams also arranged in vertically spaced set-back relation, each beam of the second set being to the rear of, opposite to and in the same horizontal plane as a beam of the first set, the beams of said second set being separated from those of the first set by the same predetermined distance, a plurality of cross beams secured to the beams of both of the first mentioned sets in alternating relation with respect thereto, the front ends of the cross beams being sloped upwardly and rearwardly from their lower edges, and means anchoring the cross beams to the first mentioned beams.

3. A shore front sand trap comprising a set of horizontally disposed parallel beams arranged in vertically spaced set-back relation, a second set of similar horizontally disposed parallel beams also arranged in vertically spaced set-back relation, each beam of the second set being to the rear of, opposite to and in the same horizontal plane as a beam of the first set, the beams of said second set being separated from those of the first set by the same predetermined distance, said beams having relatively spaced transverse recesses, cross beams alternating with the beams of the first mentioned sets and seated in said recesses, and bolts extending through each beam of the first mentioned sets and through the cross beams engaged therewith.

LOTHAR H. STOYE.